United States Patent
Petro et al.

(10) Patent No.: US 12,445,680 B2
(45) Date of Patent: Oct. 14, 2025

(54) USE OF CREDITED CONTENT TO DEDUCE NON-LINEAR CONTENT SOURCE FOR MONITORING MEDIA EXPOSURE

(71) Applicant: The Nielsen Company (US), LLC, New York, NY (US)

(72) Inventors: James Petro, Dunedin, FL (US); Jeremey M. Davis, Oldsmar, FL (US); Meryem Berrada, Beacon, NY (US); Robert Edward Taylor, Newbury, VT (US); Karem A. Fernandez, Safety Harbor, FL (US); Sandeep Tapse, Odessa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 113 days.

(21) Appl. No.: 18/480,867

(22) Filed: Oct. 4, 2023

(65) Prior Publication Data
US 2025/0119615 A1 Apr. 10, 2025

(51) Int. Cl.
*H04N 21/442* (2011.01)
(52) U.S. Cl.
CPC .............................. *H04N 21/44204* (2013.01)
(58) Field of Classification Search
CPC .................................................. H04N 21/44204
See application file for complete search history.

(56) References Cited

U.S. PATENT DOCUMENTS

| 2003/0126608 A1* | 7/2003 | Safadi | H04N 21/8173 |
| | | | 725/111 |
| 2019/0058903 A1* | 2/2019 | Petro | H04L 67/568 |
| 2022/0030044 A1* | 1/2022 | Garg | H04L 65/80 |

* cited by examiner

*Primary Examiner* — Chenea Davis
(74) *Attorney, Agent, or Firm* — McDonnell Boehnen Hulbert & Berghoff LLP

(57) ABSTRACT

A method and system for media-exposure monitoring. An example method includes a computing system receiving digital query signature data representing a media content item presented at a panelist site. Further, the method includes the computing system identifying the media content item, with the identifying being based on matching of the received digital query signature data with reference signature data. Still further, the method includes the computing system determining a streaming-media service that streamed the identified media content item to the panelist site for presentation, with the determining of the streaming-media service including finding an intersection of (i) a first set of one or more streaming-media services known to offer streaming of the media content item and (ii) a second set of one or more streaming-media services to which the panelist site subscribes.

17 Claims, 4 Drawing Sheets

USE OF CREDITED CONTENT TO DEDUCE NON-LINEAR CONTENT SOURCE FOR MONITORING MEDIA EXPOSURE

SUMMARY

In order to measure the extent to which people of various demographics are exposed to media content presented by media-presentation devices such as televisions (TVs), radios, computers, tablets, phones, gaming devices, smart speakers, or other devices, a media-monitoring company can arrange to have media-monitoring devices or "presentation meters" monitor media presentation in representative households or other sites. People who have their media exposure monitored may be considered "panelists," and the places where the monitoring occurs, such as homes, offices, or other premises, may be considered "panelist sites."

At each of various panelist sites having a media-presentation device for instance, the media-monitoring company may arrange for a presentation meter to monitor media presentation by that device and to generate query signature data representing the presented media. Further, the media-monitoring company may also operate a computing system, such as a cloud-based computing system, to receive and evaluate this presentation-meter-generated query signature data, in order to identify the media presented at the panelist site and thereby to establish associated media-exposure data.

For instance, by evaluating an audio line feed into the media-presentation device and/or by evaluating associated acoustic speaker output, a representative presentation meter at a panelist site may be configured to detect and extract watermarked identification codes from the audio and/or to generate digital audio fingerprint data representing the audio, and to report the identification codes and/or fingerprint data, along with associated timestamps, as query signature data to the computing system for analysis. Such a presentation meter may also be configured to detect the power on or off state of the media-presentation device, so that the presentation meter can limit its media-presentation monitoring to times when the media-presentation device is on and therefore likely presenting media content being delivered to the media-presentation device.

The computing system may then be configured to refer to reference signature data that maps various identification codes and/or fingerprint data to known media content items, in order to determine, based on the presentation-meter-reported identification codes and/or fingerprint data, what media content the media-presentation device was presenting at the indicated time. In particular, the computing system may be configured to search through the reference signature data in an effort to find reference signature data that matches the reported query signature data and, upon finding a match with sufficient certainty, to conclude that media content represented by the query signature data is the media associated with the matching reference signature data, and to establish associated media-presentation records for the panelist site, thus crediting the identified media content as being presented at the panelist site (e.g., as panelist-credited content).

Further, the computing system may be configured to correlate these media-presentation records with pre-stored demographics of the panelist or panelist site at issue, in order to establish associated media-exposure data, and the computing system may be configured to use this media-exposure data from multiple panelist sites as a basis to establish ratings statistics that may facilitate commercial processes such as ad placement and other content delivery.

As part of establishing this media-exposure data, it may be useful for the computing system to identify the source of the credited media content, such as the company or other entity that distributed the content to the panelist site for presentation. Including this information as part of the media-exposure data may enhance the data and associated ratings statistics and may facilitate useful action keyed to the source. For instance, knowledge that one or more panelist sites tend to present content received from a given content distributor may support a decision to arrange for that source to distribute particular ads and/or other content, among other possibilities.

The computing system's ability to determine the source of content presented at a panelist site may depend on whether the content at issue is linear or rather non-linear. Linear content is understood to be content of a linear broadcast feed such as a TV channel or radio station for instance, as such a linear broadcast feed carries a continuous stream of content over time. Whereas, non-linear content is understood to be content that could be retrieved and played on-demand, such as streaming-media content provided by an Over The Top (OTT) streaming-media service provider for instance.

The computing system may be able to determine whether presented content is linear or rather non-linear, for instance based on the computing system's matching of the query signature data with associated reference signature data. By way of example, the computing system may have access to separate sets of reference signature data for linear content and for non-linear content. Based on matching of the query signature data with reference signature data of one set or the other, the computing system may thus be able to classify the content as linear or rather non-linear. Further, linear content in particular may be timestamped (e.g., in watermark coding) in a manner that indicates its broadcast time, and this timestamp information may also serve as a basis to classify presented content as linear rather than non-linear, even for time-shifted content presentation.

As to presented content that the computing system determines to be linear, the computing system may readily determine the content source based on the identity of the linear feed itself, since particular linear feeds usually come from particular content sources. For instance, the process of matching the query signature data with reference signature data representing a particular linear broadcast channel may establish the identity of the linear broadcast channel, and the computing system may map that channel identification to a particular content distributor, such as a given cable-TV broadcaster, satellite-TV broadcaster, or terrestrial over-the air (OTA) TV broadcaster, among other possibilities.

However, as to presented content that the computing system determines to be non-linear, identifying the content source can be a technical challenge. One difficulty here is that multiple content sources may offer on-demand streaming of some of the same content as each other. Without the benefit of broadcast timestamps to help correlate presented content with a particular content source, the computing system may therefore face ambiguity as to which of various content sources distributed given non-linear content to the panelist site for presentation.

For instance, the computing system may find that query signature data representing particular content presented at the panelist site matches reference signature representing a particular known non-linear content item (e.g., a particular movie, TV show, podcast, commercial, or the like), and the computing system may then determine by reference to streaming-media-provider catalog information that that particular non-linear content item is offered for on-demand streaming by multiple streaming-media providers. At issue in that scenario may therefore be which of those streaming-media providers streamed the content item to the panelist site for presentation.

One way to help resolve this ambiguity is to monitor packet-data flow on a local area network (LAN) at the panelist site. For instance, the media-measurement company may additionally equip the panelist site with another type of meter, namely, a "streaming meter," that is configured to monitor packet-data flow on a LAN at the panelist site and to report to the computing system information about that packet-data flow. In practice, this streaming meter and the presentation meter could be separate devices or could be integrated together.

A representative streaming meter may be able to detect when the panelist site is receiving from an external source Internet Protocol (IP) address a packet-data flow that has a pattern of streaming (e.g., a high enough bit rate, consistent with typical media streaming), perhaps specifically when such a flow is destined to a known streaming-media player or other node on the LAN that may output media content for presentation by the media presentation device. The streaming meter may thus report to the computing system information such as (i) timestamps of such detected packet-data flow and (ii) the source IP address and/or other information carried in the packet-data flow that may facilitate identifying the stream source.

Given this or other such information reported by a streaming meter at the panelist site, the computing system may thereby be able to determine the source of non-linear content presented at the panelist site at a given time. For instance, provided with query signature data representing content presented at the panelist site at a given time, the computing system may correlate timestamps of that query signature data with timestamps of detected packet-data flow into the panelist site LAN, and the computing system may correlate the reported source-IP address or other such information in the packet-data flow with a particular streaming-media provider. The computing system may thereby conclude that the content presented at that time was provided by that particular streaming-media provider.

Unfortunately, however, in some situations, it may not be possible or feasible to monitor the LAN traffic flow at a panelist site to determine the source of such non-linear content. One reason for this problem is that some non-linear content presented by the media-presentation device at the panelist site might not actually flow over a LAN at the panelist site.

As a specific example of this, a cable-TV set top box at the panelist site may have various streaming-channel apps that function as streaming clients to receive streaming media sessions from streaming services, and the set top box and may output user-selected on-demand content of those streaming-channel apps for presentation by the media-presentation device. But the last mile of that media flow would be over a Data Over Cable Service Interface Specification (DOCSIS) cable transmission from a cable-TV head end to the set top box, rather than over a LAN at the panelist site. Further, it may be impossible to monitor that DOCSIS transmission due to security settings or the like.

Other analogous examples may exist as well, including but not limited to (i) a satellite-TV set top box likewise having streaming apps and outputting user-selected streaming-channel app content for presentation, but with the last mile of that flow being a satellite connection to the set top box, without traversing a panelist site LAN, and (ii) a cellular device having streaming apps and outputting streaming-channel app content for presentation, but with the last mile of that flow being a cellular connection from a cellular provider network to the cellular device, also without traversing a panelist site LAN.

At issue in these or other such scenarios is thus still which source provided the identified content presented at the panelist site, e.g., which streaming-media service provided the non-linear content to the panelist site.

The present disclosure provides a mechanism to help address this issue.

In accordance with the disclosure, for panelist-credited content that is determined to be non-linear, a computing system will deduce which of multiple sources was the source of the content based on finding an intersection of (1) a first set of sources known to be available to the panelist site and (2) a second set of sources known to provide the identified content.

In an example implementation, the sources are streaming-media services such as OTT services provided by OTT service providers for instance. At issue in that implementation may therefore be which of various known streaming-media services (i) the panelist site subscribes to and (ii) provides the identified content, e.g., as content that the streaming-media service offers for on-demand streaming.

If there is a single such streaming-media service, then the computing system may conclude that that one streaming-media service is the source of the content determined to be presented, and the computing system may accordingly enhance the media-exposure data to indicate that the credited content came from that streaming-media service. Whereas, if there are multiple such streaming-media services, and/or to increase confidence, the computing system could take into account additional factors. For instance, the computing system could additionally determine whether commercial breaks are present in the content presented at the panelist site, as a basis to determine whether a candidate streaming-media service could be the source of the content (e.g., based on whether that particular streaming service-media service provides commercial breaks, perhaps specifically per the panelist-site's subscription plan).

These as well as other aspects, advantages, and alternatives, will become apparent to those of ordinary skill in the art by reading the following detailed description, with reference where appropriate to the accompanying drawings. Further, it should be understood that the disclosure provided in this summary elsewhere in this document is provided by way of example only and that numerous variations and other examples may be possible as well.

DETAILED DESCRIPTION

Figure 1:
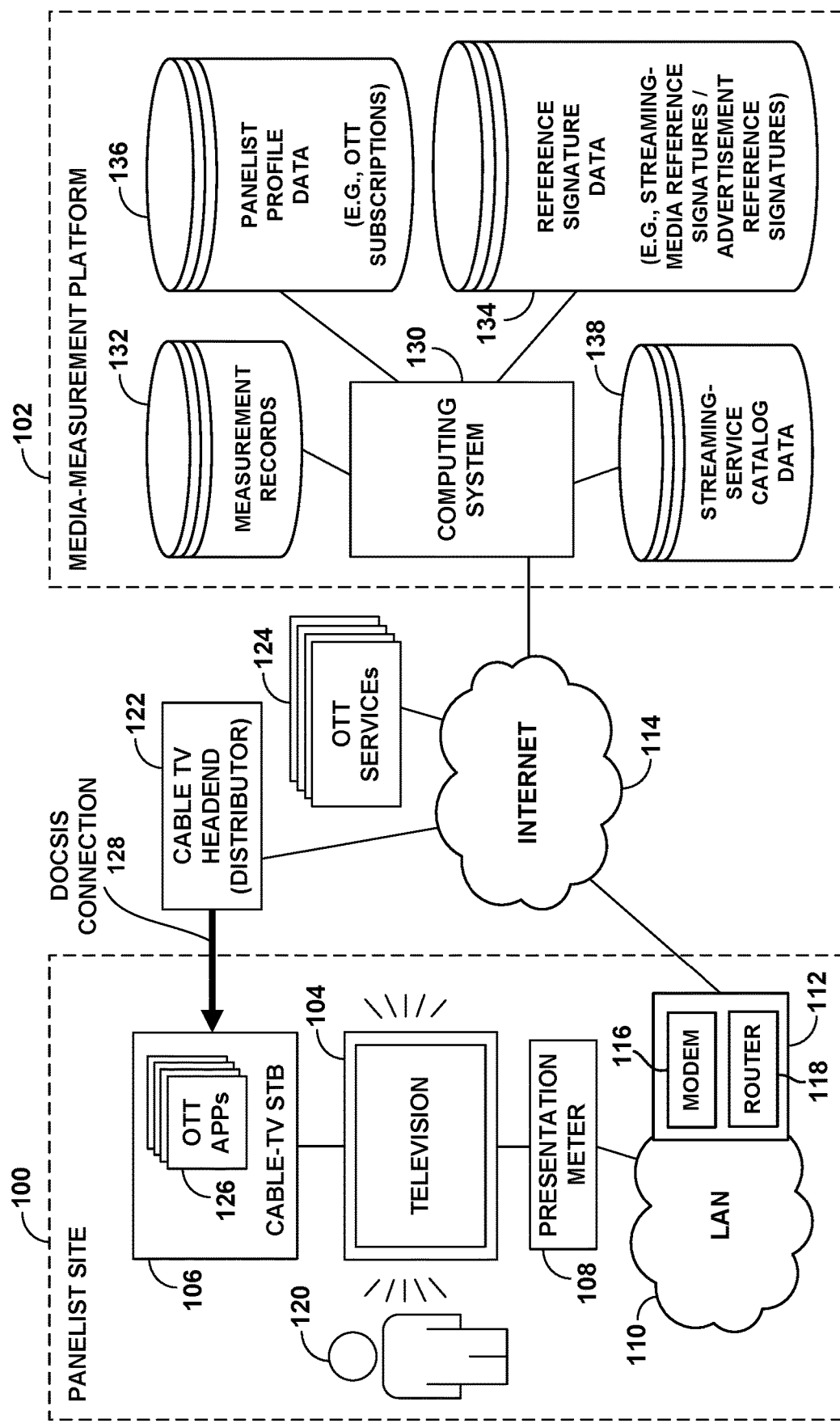
FIG. 1 is a simplified block diagram illustrating an example system.

The present description will discuss example implementation with respect to a panelist site in which the media-presentation device is a television that receives and presents media content from a connected or integrated cable-TV set top box (STB) that offers, in addition to traditional linear broadcast feeds such as various linear cable-TV channels, various streaming-media apps for receiving on-demand streaming-media content from streaming-media providers.

Other than the fact that these streaming-media apps on the STB receive this streaming-media content through a last-mile DOCSIS connection to the STB, at least some of these apps may be largely the same as streaming-media apps typically found on a LAN-connected streaming media player. Namely, each app may be provided by or otherwise associated with a respective streaming-media service provider and configured as a streaming-media client to receive on-demand streaming of user-selected content from a catalog of content offered by that streaming-media service provider in particular. Further, each app may be configured to output that received streaming-media content for presentation, in this case from the STB to the television.

It will be understood, however, that the disclosed principles could apply in other scenarios as well. For instance, the media-presentation device could take other forms, and the media-presentation device could receive and present non-linear content in another arrangement, such as from a satellite-TV set top box or from a cellular-connected device, among other possibilities. Further, the media content at issue could take other forms, such as audio-only content for instance.

More generally, it will be understood that the arrangements and processes described could take various other forms. For instance, elements and operations could be re-ordered, distributed, replicated, combined, replaced, omitted, added, or otherwise modified. In addition, elements described as functional entities could be implemented as discrete or distributed components or in conjunction with other components/modules, and in any suitable combination and location. Further, various operations described as being carried out by one or more entities could be implemented by and/or on behalf of those entities, through hardware, firmware, and/or software, such as by one or more processing units executing program instructions stored in memory, among other possibilities.

Referring to the drawings, as noted above, FIG. 1 is a simplified block diagram of an example system in which various disclosed features could be implemented. As shown, the example system includes a panelist site 100 (e.g., a panelist's home or office, among other possibilities) and a media-measurement platform 102 (e.g., one or more servers and associated systems).

In the example arrangement shown, the panelist site 100 includes a television 104, a cable-TV STB 106, a presentation meter 108, and a LAN 110. As illustrated, the presentation meter 108 sits as a node on the LAN 110. Further, the panelist site 100 includes network equipment 112, which could facilitate communication on the LAN 110 and communication between the LAN 110 and the internet 114 or another wide area network.

The network equipment 112 in the example arrangement includes a modem 116 and a router 118. The modem 116, which may be a cable, satellite, cellular, or other modem, could be configured to communicate with an associated internet service provider (ISP) (e.g., cable or satellite headend, or cellular core network) that provides connectivity with the internet 114. And the router 118, which may itself also sit as a node on the LAN 110, could be configured to route packet-based communications on the LAN 110 and, via the modem 116, between the LAN 110 and the internet 114.

The modem 116 may have an assigned IP address that is globally-routable on the internet 114 (i.e., a global IP address). For instance, when the modem 116 is initially powered on, the modem 116 may register its presence with the ISP, and the ISP may dynamically assign a global IP address to the modem 116, or the modem 116 may have a statically assigned global IP address. This global IP address assigned to the modem 116 may also pass through to the router 118 as an effective global IP address of the router 118.

Each LAN node may also have an assigned IP address that is locally-routable on the LAN 110 (i.e., a local IP address). For instance, the router 118 may have a statically assigned local IP address. Further, as the presentation meter 108 and any other LAN node is initially powered on and in communication with the router 118, the node may register its presence with the router 118, and the router 118 may dynamically assign a local IP address to the node, or the node may a statically assigned local IP address. With this assigned local IP address, the LAN node may then engage in packet-based communication on the LAN 110. Further, the LAN node may engage in packet-based communications on the internet 114, through the router 118 and the modem 116, with the router 118 performing network address translation between the device's local IP address and the router/modem's global IP address.

The television 104 at the panelist site 100 operates alone or in combination with associated systems to receive and present media content, which could include video content and audio content, such as program content (e.g., TV shows and/or movies) and/or ad content (e.g., commercial breaks). In some implementations, the television 104 may display video content while outputting corresponding audio. In other implementations the television may display video content while an interconnected audio-video (AV) receiver and/or other sound system outputs associated audio, among other possibilities. An example panelist (e.g., a human being) 120 at the panelist site 100 may thereby be exposed to this media presentation.

In the example arrangement, the television 104 is configured to receive at least some of this media content from the cable-TV STB 106. The STB 106 may be supplied by a cable-TV service provider in accordance with a cable-TV service subscription plan for the panelist site 100. In the arrangement shown, the STB 106 and television 104 are connected together, perhaps by a High-Definition Multimedia Interface (HDMI) cable connection, enabling media content flow from the STB 106 to the television 104. In an alternative arrangement, the STB 106 may be integrated with the television 104 or may be connected or integrated with other equipment that facilitates the media presentation.

The STB 106 is in turn served by a cable-TV headend 122. Namely, the STB 106 is configured to receive media content from the cable-TV headend 122 and to output that received media content for presentation by the television 104. This media content could include both linear content such as TV channels and non-linear content such as on-demand streaming media content.

A user of the STB 106, such as panelist 120, may control the STB 106 through use of a remote control (not shown) or other mechanism, to request the STB 106 to receive desired content for presentation by the television 104. To facilitate this, the STB 106 may provide a graphical user interface (GUI) on the television 104, which could show available content and enable the STB 106 to receive user input selecting the desired content, and the STB 106 may respond to this user selection by requesting and obtaining the content from the headend 122 and outputting the content for presentation.

The cable-TV headend 122 is configured to receive media content from various media sources and to provide the media content over cable connections to cable-TV subscribers such as panelist site 100. For example, through satellite, microwave, fiber, or other connections (not shown), the headend 122 may receive linear broadcast feeds of various local and national TV channels (not shown), and the headend 122 may forward one or more such linear feeds over a cable connection to a cable-TV subscriber. Further, through the internet 114, the headend 122 may receive non-linear streaming-media content requested by a cable-TV subscriber from any of various streaming-media services 124 (e.g., streaming-media servers), shown by way of example as OTT services accessible on the internet 114, and may forward that streaming-media content over a DOCSIS connection to the requesting cable-TV subscriber.

As to streaming-media content in particular, the cable-TV service provider may have agreements with providers of the various streaming-media services 124, which may allow the cable-TV service provider to extend those streaming-media services on demand to cable-TV subscribers. Further, the STB 106 at panelist site 100 may be provisioned with streaming-media apps 126, shown as OTT apps, each functioning as a streaming-media client configured to interoperate with a respective one of the streaming-media services 124. And the GUI provided by the STB 106 may include a menu of these streaming-media apps 126.

A user of the STB 106, such as panelist 120, may thus invoke a desired streaming-media app 124 associated with a given streaming-media service 124 and may further select a particular media content item (e.g., TV show or movie) from a set of those available to be streamed from that streaming-media service 124. The STB 106 may then receive a packet-based media stream carrying the selected media content item and, as the STB 106 receives that media stream, the STB 106 may output the media for presentation by the television 104.

With this arrangement, the cable-TV headend 122 may function as a proxy for signaling and streaming-media communication between the STB 106 and each of one or more the streaming-media services 124, thus enabling the STB 106 to engage in packet-data communication with a given such streaming-media service 124 in much the same way as a LAN-connected streaming-media player may function. A difference here, however, would be that the STB's packet-data communication with the streaming-media service 124 would traverse a DOCSIS connection 128 between the headend 122 and the STB 106.

For instance, when the user of the STB 106 selects a desired media content item to play, the STB 106 may responsively engage in packet-based session-setup signaling via the DOCSIS connection 128 with an associated streaming-media service 124 (e.g., an associated streaming-media server), to initiate and manage a streaming-media session that would stream the selected media stream in real-time to the STB 106 for playout, and that streaming-media session would in turn flow over the DOCSIS connection 128 to the STB 106. To facilitate this process, for example, the GUI may have encoded a uniform resource locator (URL) in association with a thumbnail representation of the media stream at issue, and the STB 106 may thus send a request to that URL to begin streaming-session setup.

Without limitation, streaming sessions like this could operate according to any of a variety of well-known adaptive bit-rate streaming protocols, examples of which include Dynamic Adaptive Streaming over Hypertext Transfer Protocol (HTTP) (DASH), HTTP Live Streaming (HLS), and Smooth Streaming Transport Protocol (SSTP).

Under such a protocol, the STB 106 may first request and obtain from the streaming-media service 124 a manifest that lists media stream segments and bit-rate versions available per segment. The STB 106 may then proceed to request and obtain desired bit-rate versions of those segments in sequence, varying the bit rate over time as necessary to help account for changes in operational conditions. And as the STB 106 receives the segments, the STB 106 may buffer the segments and ultimately transcode them into a form suitable for output to and presentation by the television 104, thus facilitating largely real-time presentation of the selected media stream as the STB 106 receives the media stream.

These communications between the STB 106 and the streaming-media service 124 via the DOCSIS connection 128 may all be packet-based. For instance, to obtain a manifest for the selected stream, the STB 106 may transmit to the streaming-media service 124 one or more IP packets carrying a request for the manifest and may receive in response from the streaming-media service 124 one or more IP packets carrying the requested manifest. Likewise, to obtain the sequential segments of the media stream for playout, the STB 106 may transmit to the streaming-media service a number of IP packets carrying requests for the segments and may receive in response from the streaming-media service 124 packets that carry the requested segments. In alternative implementations, the STB 106 may instead engage in such packet-based communications with the headend 122, and the headend 122 may in turn engage in corresponding communications with the streaming-media service 124.

Continuing with reference to FIG. 1, the presentation meter 108 at the panelist site 100 may operate as discussed above to log media presentation and to report that logged data to a computing system 130 of the media-measurement platform 102, for use in generating audience ratings or for other purposes. In particular, the presentation meter 108 may operate to monitor media presentation by the television 104.

In line with the discussion above, the presentation meter 108 may be configured to monitor both the on/off state of the television 104 and media presentation by the television 104. To facilitate monitoring the on/off state of the television 104, the presentation meter 108 could be connected as an intermediary in a path of power-supply to the television 104 if applicable. The presentation meter 108 could then monitor current flow and/or other electronic characteristics on that path, to determine when the television 104 is powered on and when the television 104 is powered off. The presentation meter 108 could then limit its monitoring of media presentation by the television 104 to times when television 104 is powered on.

Further, the presentation meter 108 could be configured to monitor media presentation by the television in various ways. For instance, the presentation meter 108 could be connected as an intermediary in the media-delivery path between the STB 106 and the television 104, if applicable. The presentation meter 108 could then monitor media flowing on that path. Alternatively, the presentation meter 108 could include one or more microphones and/or cameras configured to receive audio and/or video output presented by the television 104 and/or associated systems and could monitor that received audio and/or video.

The presentation meter 108 may interwork with the computing system 130 of the media-measurement platform 102 to detect and evaluate media presentation by the television 104, which may include identifying the media presented by the television 104, to facilitate generating audience ratings statistics and/or for other purposes. By way of example, the presentation meter 108 may detect the presence of media output by the television 104 and may obtain media-signature data such as digital fingerprints and/or watermark encoded information from the media and transmit the obtained media-signature data as query signature data to the computing system 130 for evaluation as discussed above.

As to digital fingerprints, for instance, as the media presentation proceeds, the presentation meter 108 may evaluate the media being presented and, based on the evaluation, may generate digital query fingerprints each representing component characteristics of the media, such as key audio-frequency characteristics and/or key video-pixel characteristics. Further, the presentation meter 108 may include with each query fingerprint a timestamp indicating time of presentation of the media (e.g., media frame) represented by that particular query fingerprint. The presentation meter 108 may then periodically send bundles of these generated query fingerprints as query signature data to the computing system 130 for analysis.

As to watermarking, on the other hand, the media content as presented by the television 104 may be periodically or otherwise from time to time watermarked (e.g., steganographically encoded) with media-identifying information or with data that correlates with media-identifying information.

Audio, for instance, could be watermarked with such data by including a supplemental audio waveform (optimally outside of human hearing range) that carries a representation of the data. By way of example, if a codeword that identifies the media is a sequence of digits, each digit could be sequentially encoded into the audio by adding a unique tone combination having a predefined correlation with the digit. Further, synchronizing symbols could be encoded as respective tone combinations as well, to demarcate the presence of the watermark.

Using audio for example, as the media presentation proceeds, the presentation meter 108 may thus monitor the audio in search of such a watermark and, upon finding a watermark, may decode the watermark by evaluating the sequential tone combinations, as a basis to extract the media-identifying information. The presentation meter 108 may thus record this media-identifying information over time with timestamps indicating when the watermarked media was presented. And the presentation meter 108 may likewise periodically send bundles of this media-identifying information as query signature data to the computing system 130 for analysis.

In real-time or through post-processing as noted above, the computing system 130 may then compare this presentation-meter-reported query signature data with established reference signature data respectively representing known media content (e.g., known programs, advertisements, channels, etc.) And upon finding with sufficient certainty that the query signature data representing the media content presented at the panelist site 100 matches reference signature data representing specific known media content, the computing system 130 could conclude that the media presented at the panelist site 100 is that specific known media content.

The computing system 130 could then establish a media-presentation record as noted above, indicting the media presented at the panelist site 100. Further, the computing system 130 may correlate this record with associated panelist demographics and may use the resulting records as a basis to establish media-exposure data and audience ratings, and/or to facilitate one or more other operations.

In particular, whether through use of fingerprinting, watermarking, or other media-signature processes, the computing system 130 may thereby establish records 132 indicating times when particular identified media content was presented at the panelist site 100 and correspondingly times when one or more panelists at the panelist site 100 were exposed to that media. Further, the computing system 130 may correlate this information with predetermined demographics regarding one or more panelists at the panelist site 100, to establish records of times when one or more panelists of the predetermined demographics were exposed to the identified media. The computing system 130 may further aggregate this type of information from multiple panelist sites as a basis to generate more comprehensive ratings statistics, which may help inform and control later placement of program or advertisement content and/or other actions.

In practice, the computing system 130 may have access to various sets of reference signature data to facilitate this analysis. For instance, the computing system 130 may have access to one or more sets of reference signature data having timestamped reference signatures of known linear broadcast content items. Further, the computing system 130 may have access to one or more other sets of reference signature data having reference signatures of known streaming-media content items, such as TV shows, movies, podcasts, and possibly advertisements (e.g., commercials).

FIG. 1 illustrates an example of reference signature data 134 having reference signatures of known streaming-media content items. This reference signature data 134 could be pre-established by evaluating known media content items, possibly provided by various streaming-media service providers, advertisers, etc., extracting from the known media content items watermarked codes as reference codes keyed to those known media content items and/or generating digital fingerprint data as reference fingerprint data representing and thus keyed to the known media content items, among other possibilities.

In practice, the computing system 130 may conduct its matching process with respect to query signature data that the computing system 130 receives from the presentation meter 108 over time or that otherwise represents media content presented at the panelist site 100 over time. That way, the computing system 130 could establish records that indicate, per unit time, what media content was presented at the panelist site 100. For instance, the computing system 130 may establish these records on a per minute basis or even a per-sub-minute basis, among other possibilities. Further, the computing system 130 may conduct this analysis in real-time (e.g., as the computing system receives the query signature data from the panelist site, possibly soon after the associated media presentation occurred) and/or through post-processing (e.g., at the end of each day), among other possibilities.

As to each of various time segments of this presentation-meter-provided query signature data representing a corresponding time segment of media presentation at the panelist site 100, the computing system 130 may further conduct its analysis as a multi-step process, first attempting to find a match with linear-broadcast feed reference signature data and, upon finding no such match, then attempting to match the query signature data with the streaming-media reference signature data 134. Alternatively, the computing system 130 may conduct its analysis in another manner.

By matching a given time segment of presentation-meter reported query signature data with reference signature data representing a known streaming-media content item, the computing system 130 may thereby identify the streaming-media media content that was being presented at that time at the panelist site, thus crediting the identified streaming-media media content as being presented at the panelist site (e.g., as panelist-credited content).

Further in line with the discussion above, the computing system 130 could also engage in a process to determine the source of this credited streaming-media content, and the computing system 130 could enhance its associated measurement records 132 by further specifying this determined source, which could help establish improved ratings data.

As explained above, a technical issue with the computing system 130 determining the source of streaming-media content that the panelist site receives through the DOCSIS connection 128 (or other such last-mile connection) is that multiple streaming media services 124 may offer the same content for streaming. For instance, if the credited streaming-media content item is a given TV show or a given movie, multiple different streaming-media services 124 may all offer streaming of that same TV show or movie. Consequently, the computing system's mere identification of the streaming-media content item presented would not suffice to establish which streaming-media service 124 streamed that content item to the panelist site 100.

To overcome this technical issue as noted above, the computing system 130 can programmatically deduce the streaming-media source of a given credited content item by finding an intersection between two data sets: (1) a set of streaming-media services to which the panelist site 100 is known to subscribe and (2) a set of streaming-media services known to offer streaming of the credited content item.

To facilitate this, the computing system 130 may have access to additional reference data to which the computing system 130 could refer to find this intersection of the data sets. In particular, as shown in FIG. 1, the computing system 130 may have access to panelist profile data 136 and streaming-service catalog data 138.

The panelist profile data 136 may include records of applicable streaming-media service subscriptions respectively for each of panelist sites (e.g., of panelists, owners, or others associated with panelist sites). This panelist profile data 136 may include a record for panelist site 100 of each of one or more streaming-media service subscriptions that the panelist site 100 has.

For instance, as to each of one or more of the streaming-media services 124, a user (e.g., the panelist 120) associated with the panelist site 100 may have entered into a subscription agreement with the streaming-media service 124, establishing or maintaining a streaming-media service account with that streaming-media service 124 that authorizes receipt of streaming-media content from that streaming-media service 124. Further, using the associated streaming-media app 126 on the STB 106, the user may have logged into that streaming-media service account, thus enabling the STB 106 to receive streaming-media content from that particular streaming-media service.

During a process of registering the panelist site 100 as a panelist site with the media-measurement company that operates platform 102, and/or at one or more other times, the user may further inform the media-measurement company of each of the streaming-media services 124 to which the panelist site 100 thus subscribes. This may include each streaming-media service that is logged in and/or otherwise active to be used at the panelist site 100 and that may be subject to media measurement, such as each of one or more streaming-media services logged in on the STB 106.

For instance, the user may report each such active streaming-media subscription through an online interface to the computing system 130. The computing system 130 may then record this information as part of panelist profile data 134 for later reference. Thus, the panelist profile data 134 may indicate for the panelist site 100 each of the one or more streaming-media services to which the panelist site 100 subscribes, each as a respective candidate streaming-media source for streaming-media content presented at the panelist site 100.

Note that a given streaming-media service provider may offer ad-supported service plans and/or ad-free versions of its streaming-media service, possibly charging more for a subscription to an ad-free service plan than for a subscription to a corresponding ad-supported service plan. Each of one or more streaming-media services to which the panelist site 100 subscribes may thus have an attribute of ad-free or ad-supported, and the panelist profile data 136 may also include an indication of this attribute respectively for each applicable streaming-media service to which the panelist site 100 subscribes.

The streaming-service catalog data 138, on the other hand, may include records of streaming-media content items offered for streaming respectively by each of various streaming-media services. For instance, respectively for each of the streaming-media services 124, this data may specify all of the streaming-media content items (e.g., TV shows, movies, podcasts, etc.) that a user could opt to receive on demand from that streaming-media service. This data could be established based on reporting from the various streaming-media service providers or by programmatic evaluation of content menus provided by the various streaming-media services 124, among other possibilities.

With these sets of data, the computing system 130 may thereby deduce which streaming-media service 124 served a given credited content item to the panelist site 100. For instance, through the signature matching described above, the computing system 130 may determine an identifier of the streaming-media content item presented at the panelist site. Further, the computing system 130 may run a query on the streaming-service catalog data 138 to find a first set of streaming-media services that offer streaming of that particular media content item. And the computing system 130 may run a query on the panelist profile data 136 to find a second set of streaming-media services to which the panelist site 100 subscribes. The computing system 130 may then optimally determine an intersection of the first set with the second set, namely a set of one or more streaming-media services (i) to which the panelist site 100 subscribes and (ii) that each offer streaming of the credited content item.

If the computing system 130 finds that the intersection of the first set and the second set is just a single streaming-media service, then, based at least on that finding, the computing system 130 may reasonably conclude that that is the streaming-media service that streamed the credited content item to the panelist site, and so the computing system may record that streaming-media service as the source of that credited content item.

Whereas, if the computing system 130 finds that the intersection of the first set and the second set is two or more streaming-media services, or otherwise, the computing system 130 may take into account one or more additional factors as a basis to deduce which streaming-media service streamed the credited content item to the panelist site.

Without limitation, an example additional factor can be whether or not the credited content item included commercial breaks (e.g., ad pods). In particular, if the credited content item included one or more commercial breaks, then, based on the presence of the one or more commercial breaks, the computing system 130 may filter the intersection set to be limited to ad-supported subscriptions. For instance, in that case, the computing system 130 could filter the intersection of the first set and the second set to remove any streaming-media service with which the panelist site 100 has an ad-free subscription plan. If this filtering limits the intersection set to just a single streaming-media service, then the computing system 130 could responsively proceed as noted above. Otherwise or alternatively, the computing system may consider one or more other factors to help focus the analysis.

To determine whether a credited content item included one or more commercial breaks, the computing system 130 could consider a time sequence of signature matching data for query signature data reported by the presentation meter 108, corresponding with a time sequence of content presented at the panelist site 100. Over that time sequence, the computing system 130 may find that the query signature data for a given period of time of presentation at the panelist site 100 matched reference signature data representing the credited content item such as a given TV show or movie, except for one or more sub-time-segments of that time period in which the query signature data instead matched reference signature data for one or more ads.

Finding one or more such temporary commercial breaks in the credited content item may support the computing system 130 concluding that the credited content item included one or more commercial breaks. Based at least on this finding, the computing system 130 may therefore filter the intersection set to just one or more ad-supported streaming services, which may help facilitate the computing system 130 identifying the source of the credited content item.

Figure 2:
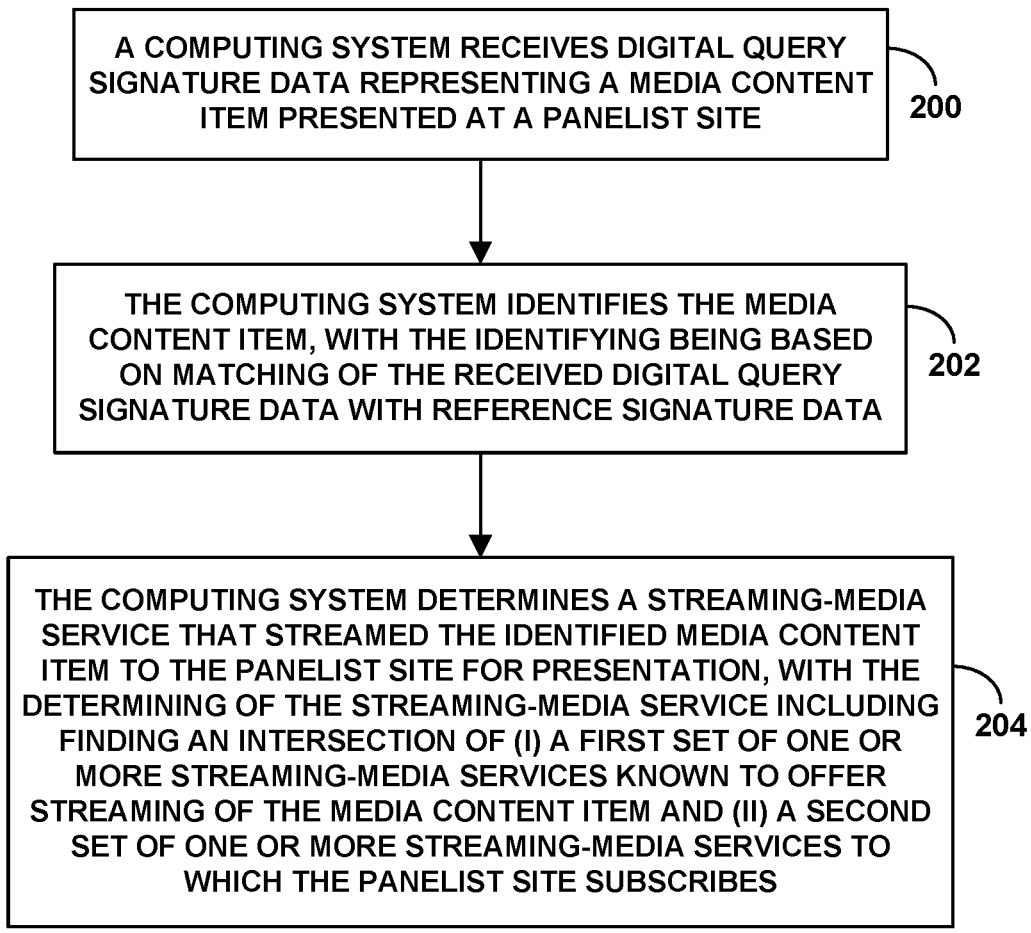
FIG. 2 is a flow chart illustrating an example method.

FIG. 2 is next a flow chart illustrating a method for media-exposure monitoring, which could be carried out by way of example by a computing system as discussed above, among other possibilities. As shown in FIG. 2, at block 200, the method includes the computing system receiving digital query signature data representing a media content item presented at a panelist site. Further, at block 202, the method includes the computing system identifying the media content item, with the identifying being based on matching of the received digital query signature data with reference signature data. Still further, at block 204, the method includes the computing system determining a streaming-media service that streamed the identified media content item to the panelist site for presentation, with the determining of the streaming-media service including finding an intersection of (i) a first set of one or more streaming-media services known to offer streaming of the media content item and (ii) a second set of one or more streaming-media services to which the panelist site subscribes.

In line with the discussion above, the method could additionally include the computing-system establishing media-exposure data based on the determining.

Further, as discussed above, the act of determining of the media source could include (i) determining that the media content item as presented at the panelist site included one or more commercial breaks, and (ii) based on the determining that the media content item as presented at the panelist site included one or more commercial breaks, limiting the second set to ad-supported streaming-media service.

Still further, as discussed above the streaming of the identified media content item to the panelist site for presentation traverses a data-over-cable connection (e.g., DOCSIS connection) from a cable-television headend to a cable-television set top box at the panelist site.

In addition, as discussed above, the media content item could be an item such as a TV show, a movie, or a podcast, among other possibilities.

Further, as discussed above, the act of finding the intersection between the first set and the second set could involve (i) obtaining the first set of streaming-media services by querying streaming-service catalog data including records of streaming-media content items offered for streaming respectively by each of various streaming-media services and (ii) obtaining the second set of streaming-media services to which the panelist subscribes by querying panelist profile data including records of streaming-media service subscriptions respectively for each of various panelist sites.

As yet additionally discussed above, the method could also include, as a precursor to the identifying and determining operations, the computing system finding that the digital query signature data does not match linear broadcast reference signature data.

Note also that, as an alternative to identifying the media content based on a comparison of received query signature data with reference signature data, it may be the case that the computing system may more directly determine an identity of the presented media content. For instance, if the presentation meter is able to extract the identity from a watermark or the like in the media content, the presentation meter may report that identity to the computing system, and the computing system may thereby identify the media content by that reported identity. Other arrangements and processes may be possible as well.

Figure 3:
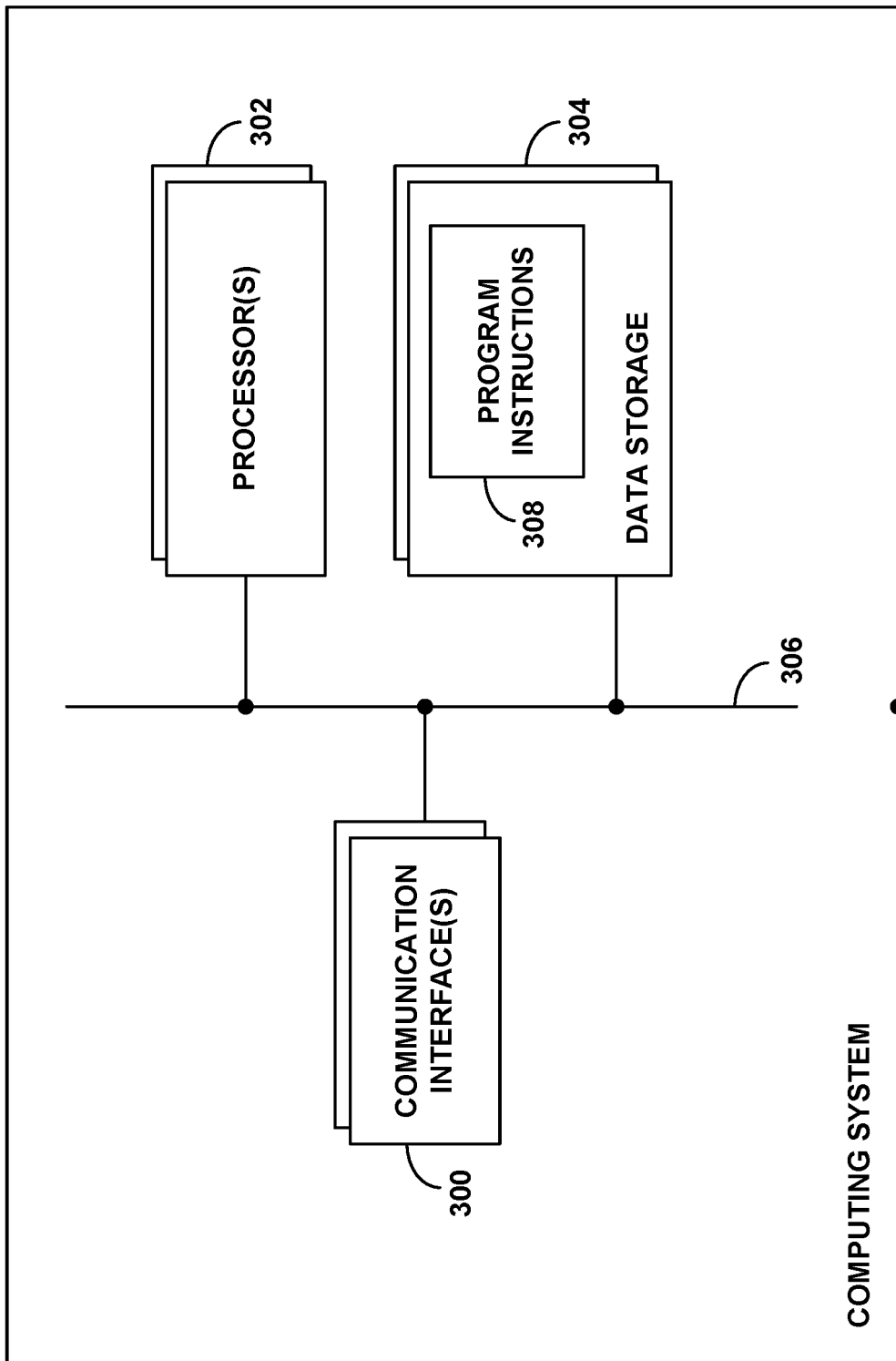
FIG. 3 is a simplified block diagram of an example computing system.

FIG. 3 is a simplified block diagram of a computing system that could be configured to carry out various operations such as those discussed herein. As shown in FIG. 3, the example computing system could include at least one communication interface 300, at least one processor 302, and at least one non-transitory data storage 304, which could integrated together or communicatively linked together by a system bus, network, or one or more other connection mechanisms 306.

The at least one communication interface 300 could comprise one or more interfaces to facilitate wired and/or wireless communication with one or more other entities. Examples of such interfaces could include, without limitation, wired Ethernet interfaces and/or WiFi interfaces.

The at least one processor 302 could comprise one or more general purpose processing units (e.g., microprocessors) and/or one or more specialized processing units (e.g., digital signal processors, dedicated audio processors, dedicated watermark processors, etc.) Further, the at least one non-transitory data storage 304 could comprise one or more volatile and/or non-volatile storage components (e.g., flash, optical, magnetic, ROM, RAM, EPROM, EEPROM, etc.), which may be integrated in whole or in part with the at least one processor 302. As further shown, the at least one non-transitory data storage 304 could store program instructions 308, which may be executable by the at least one processor 302 to carry out various computing-system operations described herein.

Figure 4:
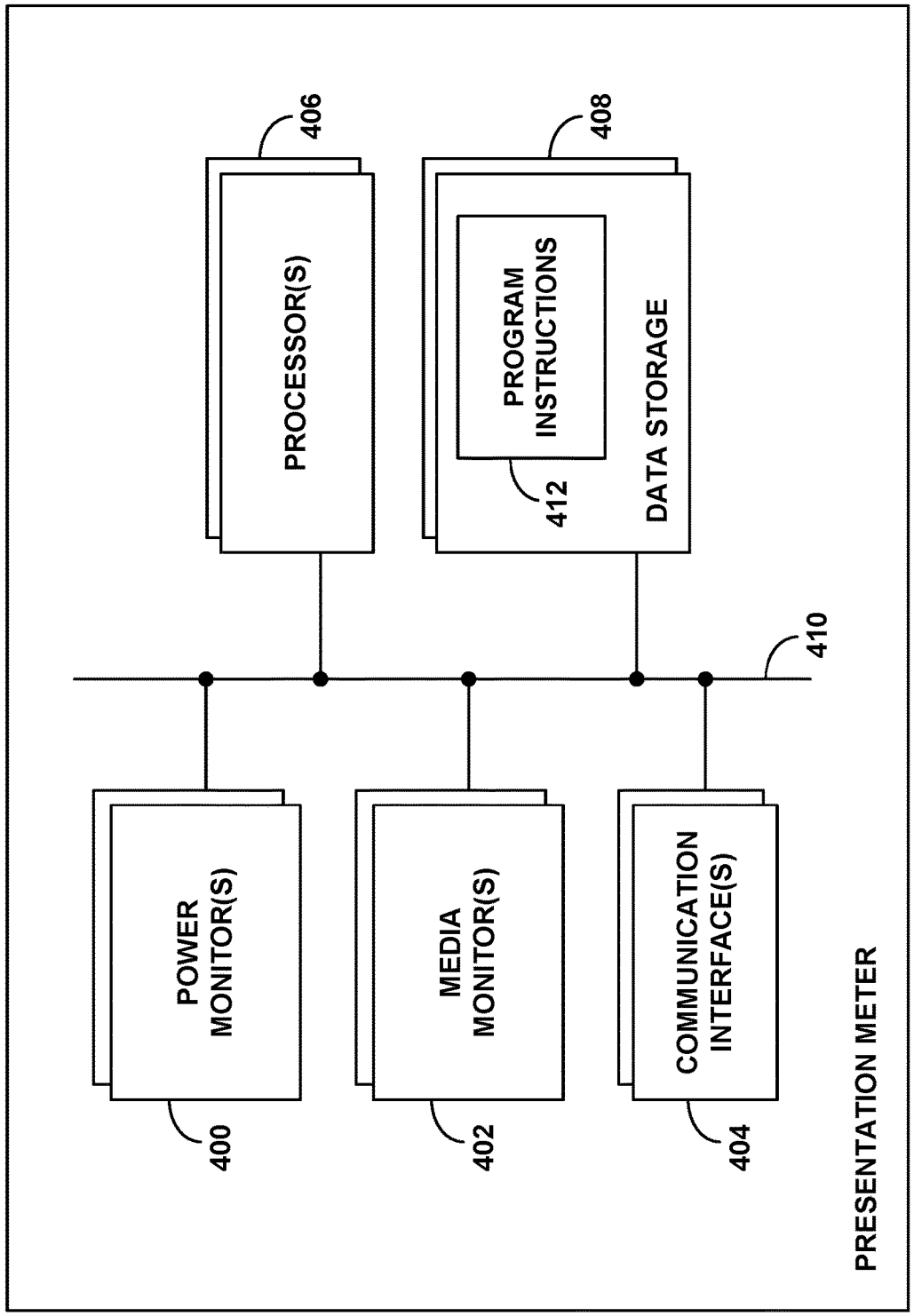
FIG. 4 is a simplified block diagram of an example meter for monitoring media exposure.

FIG. 4 is a simplified block diagram of a presentation meter. As noted above, such a meter could be positioned and/or connected in a manner that enables the meter to monitor media presented by a media-presentation device such as the television 104, and that may also enable the meter to monitor the on/off status of the television 104.

As shown in FIG. 4, the example meter includes at least one power monitor 400, at least one media monitor 402, at least one communication interface 404, at least one processor 406, and at least one non-transitory data storage 408, which could integrated together or communicatively linked together by a system bus, network, or one or more other connection mechanisms 410.

The at least one power monitor 400 could comprise a circuit for monitoring power flow to the media-presentation device, such as by tapping into a power-supply path to the media-presentation device and measuring current flow. The at least one power monitor 400 may thus operate to determine when the media-presentation device is powered on and when the media-presentation device is powered off.

The at least one media monitor 402 may comprise one or more microphones and/or cameras and associated processing circuitry or other logic configured to monitor media output from the media-presentation device and/or a circuit for monitoring media flow into the media-presentation device by tapping into a media-delivery path to the media-presentation device. The at least one media monitor 402 may thus operate to detect media presentation by the media-presentation device, which may further include obtaining media-signature data to facilitate identifying the presented media.

The at least one communication interface 404 may comprise one or more wired and/or wireless network interfaces, such as wired Ethernet interfaces and/or WiFi interfaces, to facilitate communication with other entities. For instance, the illustrated meter may use such a communication interface to report logged information to another meter and/or to a media-measurement server, among other possibilities.

The at least one processor 406 may comprise one or more general purpose processing units (e.g., microprocessors) and/or one or more specialized processing units (e.g., digital signal processors, dedicated audio processors, dedicated watermark processors, etc.) Further, the at least one non-transitory data storage 408 may comprise one or more volatile and/or non-volatile storage components (e.g., flash, optical, magnetic, ROM, RAM, EPROM, EEPROM, etc.), which may be integrated in whole or in part with the at least one processor 406. Still further, the at least one non-transitory data storage 408 may store program instructions 412, which may be executable by the at least one processor 406 to carry out various operations described herein.

The present disclosure also contemplates at least one non-transitory computer readable medium that is encoded with, stores, or otherwise embodies program instructions executable by at least one processor to carry out various operations as described above.

Exemplary embodiments have been described above. Those skilled in the art will understand, however, that changes and modifications may be made to these embodiments without departing from the true scope and spirit of the invention.

We claim:

1. A method for media-exposure monitoring comprising:
    obtaining, by a computing system, digital query signature data representing a media content item presented at a panelist site, wherein the obtaining of the digital query signature data comprises using a meter to monitor media-flow to a media-presentation device at the panelist site or to monitor media-output by the media-presentation device at the panelist site;
    identifying, by the computing system, the media content item, wherein the identifying includes matching of the received digital query signature data with reference signature data;
    determining, by the computing system, a streaming-media service that streamed the identified media content item to the panelist site for presentation, wherein the determining of the streaming-media service includes finding an intersection of (i) a first set of one or more streaming-media services known to offer streaming of the media content item and (ii) a second set of one or more streaming-media services to which the panelist site subscribes; and
    establishing, by the computing system, media-exposure data based on the determining.

2. The method of claim 1, wherein the determining of the streaming-media service includes (i) determining that the media content item as presented at the panelist site included one or more commercial breaks, and (ii) based on the determining that the media content item as presented at the panelist site included one or more commercial breaks, limiting the second set to ad-supported streaming-media service.

3. The method of claim 1, wherein the streaming of the identified media content item to the panelist site for presentation traverses a data-over-cable connection from a cable-television headend to a cable-television set top box at the panelist site.

4. The method of claim 1, wherein the media content item is selected from the group consisting of a television show, a movie, and a podcast.

5. The method of claim 1, wherein finding the intersection between the first set and the second set comprises:
    obtaining the first set of streaming-media services by querying streaming-service catalog data including records of streaming-media content items offered for streaming respectively by each of various streaming-media services; and
    obtaining the second set of streaming-media services to which the panelist subscribes by querying panelist profile data including records of streaming-media service subscriptions respectively for each of various panelist sites.

6. The method of claim 1, further comprising, as a precursor to the identifying and determining, finding by the computing system that the digital query signature data does not match linear broadcast reference signature data.

7. A computing system comprising:
    a meter configured to obtain digital signature data representing a media content item presented at a panelist site, wherein the obtaining of the digital query signature data comprises causing monitoring of media-flow to a media-presentation device at the panelist site or monitoring of media-output by the media-presentation device at the panelist site;
    at least one processor;
    at least one non-transitory data storage;
    program instructions stored in the at least one non-transitory data storage and executable by the at least one processor to carry out operations including:
        receiving the digital query signature data representing the media content item presented at the panelist site;
        identifying the media content item, wherein the identifying includes matching of the received digital query signature data with reference signature data;
        determining a streaming-media service that streamed the identified media content item to the panelist site for presentation, wherein the determining of the streaming-media service includes finding an intersection of (i) a first set of one or more streaming-media services known to offer streaming of the media content item and (ii) a second set of one or more streaming-media services to which the panelist site subscribes; and establishing media-exposure data based on the determining.

8. The computing system of claim 7, wherein the determining of the streaming-media service includes (i) determining that the media content item as presented at the panelist site included one or more commercial breaks, and (ii) based on the determining that the media content item as presented at the panelist site included one or more commercial breaks, limiting the second set to ad-supported streaming-media service.

9. The computing system of claim 7, wherein the streaming of the identified media content item to the panelist site for presentation traverses a data-over-cable connection from a cable-television headend to a cable-television set top box at the panelist site.

10. The computing system of claim 7, wherein the media content item is selected from the group consisting of a television show, a movie, and a podcast.

11. The computing system of claim 7, wherein finding the intersection between the first set and the second set comprises:

obtaining the first set of streaming-media services by querying streaming-service catalog data including records of streaming-media content items offered for streaming respectively by each of various streaming-media services; and obtaining the second set of streaming-media services to which the panelist subscribes by querying panelist profile data including records of streaming-media service subscriptions respectively for each of various panelist sites.

12. The computing system claim 7, wherein the operations additionally include, as a precursor to the identifying and determining, finding that the digital query signature data does not match linear broadcast reference signature data.

13. At least one non-transitory computer-readable medium having stored thereon instructions executable by at least one processor to carry out operations comprising:

obtaining digital query signature data representing a media content item presented at a panelist site, wherein the obtaining of the digital query signature data comprises using a meter to monitor media-flow to a media-presentation device at the panelist site or to monitor media-output by the media-presentation device at the panelist site;

identifying the media content item, wherein the identifying includes matching of the received digital query signature data with reference signature data;

determining a streaming-media service that streamed the identified media content item to the panelist site for presentation, wherein the determining of the streaming-media service includes finding an intersection of (i) a first set of one or more streaming-media services known to offer streaming of the media content item and (ii) a second set of one or more streaming-media services to which the panelist site subscribes; and establishing media-exposure data based on the determining.

14. The at least one non-transitory computer-readable medium of claim 13, wherein the determining of the streaming-media service includes (i determining that the media content item as presented at the panelist site included one or more commercial breaks, and (ii) based on the determining that the media content item as presented at the panelist site included one or more commercial breaks, limiting the second set to ad-supported streaming-media service.

15. The at least one non-transitory computer-readable medium of claim 13, wherein the streaming of the identified media content item to the panelist site for presentation traverses a data-over-cable connection from a cable-television headend to a cable-television set top box at the panelist site.

16. The at least one non-transitory computer-readable medium of claim 13, wherein the media content item is selected from the group consisting of a television show, a movie, and a podcast.

17. The at least one non-transitory computer-readable medium of claim 13, wherein finding the intersection between the first set and the second set comprises:

obtaining the first set of streaming-media services by querying streaming-service catalog data including records of streaming-media content items offered for streaming respectively by each of various streaming-media services; and obtaining the second set of streaming-media services to which the panelist subscribes by querying panelist profile data including records of streaming-media service subscriptions respectively for each of various panelist sites.

* * * * *